United States Patent [19]
Korn

[11] Patent Number: 5,670,916
[45] Date of Patent: Sep. 23, 1997

[54] ADAPTIVE EQUALIZER CIRCUIT INCLUDING MULTIPLE EQUALIZER UNITS

[75] Inventor: Thomas Korn, San Jose, Calif.

[73] Assignee: Cypress Semiconductor Corp., San Jose, Calif.

[21] Appl. No.: 549,373

[22] Filed: Oct. 27, 1995

[51] Int. Cl.$^6$ ............................................. H04B 3/06
[52] U.S. Cl. ..................... 333/18; 333/28 R; 375/232
[58] Field of Search .................... 333/18, 19, 28 R, 333/166; 375/229, 230, 232, 233; 370/32.1, 69.1, 70; 364/724.19, 724.2

[56] References Cited

U.S. PATENT DOCUMENTS

| | | | |
|---|---|---|---|
| 4,063,183 | 12/1977 | Evans | 333/18 X |
| 5,434,883 | 7/1995 | Kimoto et al. | 333/18 X |

OTHER PUBLICATIONS

N.G. Vinter: "Equalizer Circuit for Data Transmission System", *Xerox Disclosure Journal*, vol. 1, No. 4, Apr. 1976; pp. 71–72.

Primary Examiner—Benny T. Lee
Assistant Examiner—Barbara Summons
Attorney, Agent, or Firm—Bliss McGlynn, P.C.

[57] ABSTRACT

An equalizer circuit for equalizing waveform distortion of a signal that propagates through a lossy transmission cable connected between a receiver and a transmitter, the equalizer circuit including a plurality of equalizer units which are connected in series with one another and a plurality of taps, each tap providing a different equalized representation of a signal being transmitted through the transmission cable to which the equalizer circuit is connected, and a control circuit for determining the tap at which appears an equalized signal that exhibits minimum error relative to the transmitted signal, the determination being made by applying an envelope detector to each tap for obtaining low frequency envelope signals for the signal appearing at each tap and for comparing the low frequency envelope signals thus obtained with a common DC reference signal that is related to the ideal transmitted signal amplitude.

14 Claims, 4 Drawing Sheets

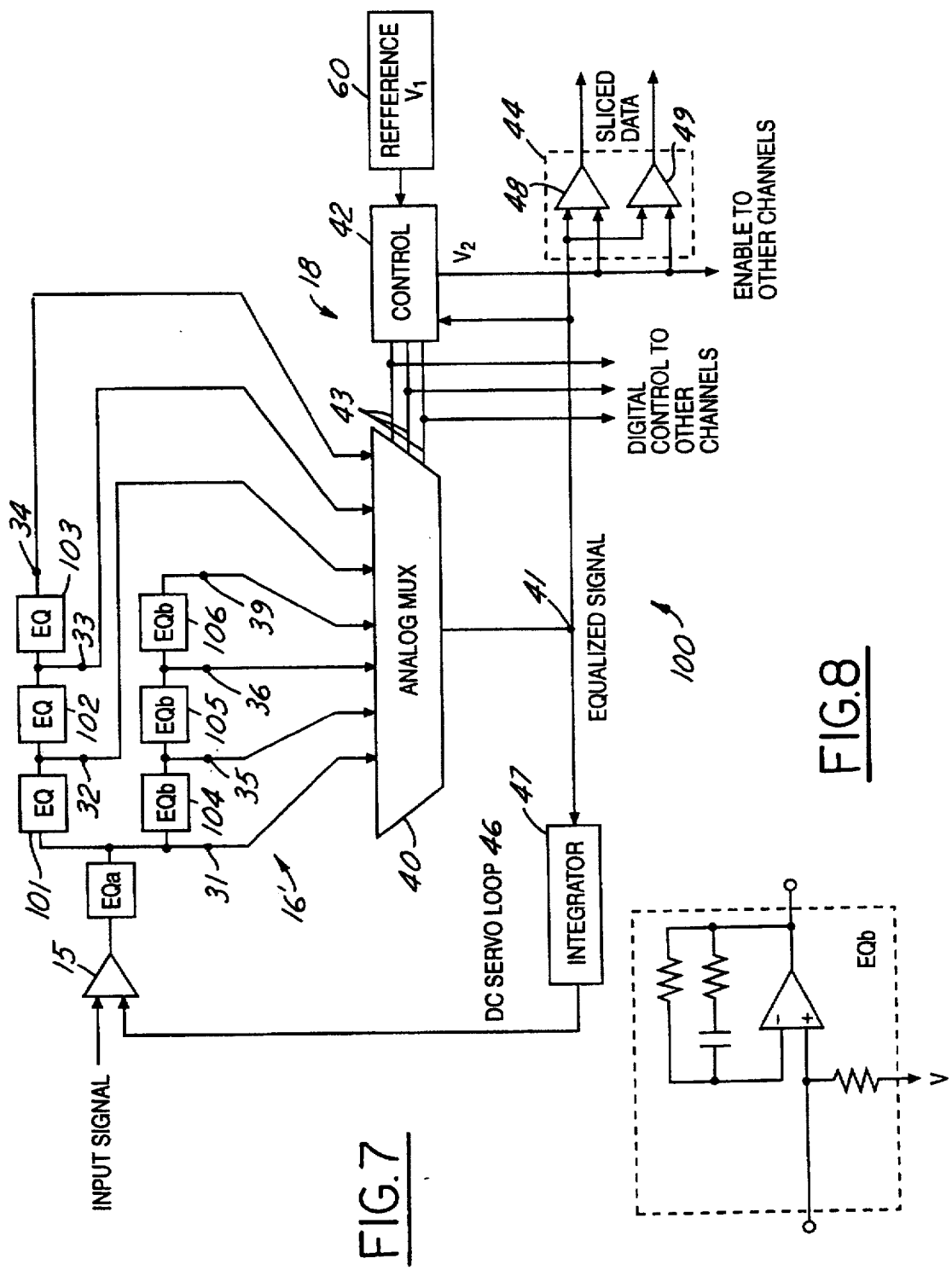

(12)

ADAPTIVE EQUALIZER CIRCUIT INCLUDING MULTIPLE EQUALIZER UNITS

BACKGROUND OF THE INVENTION

This invention relates to signal compensation circuits, and more particularly, to an equalizer circuit for equalizing waveform distortion of a signal that propagates through a lossy transmission medium.

Equalizer circuits are commonly used to compensate certain types of distortion in electronic signals in transmission systems or magnetic recording systems, for example. The purpose of an equalizer circuit in a transmission system at the receiving end, for example, is to provide both phase and magnitude adjustments to the received signal which are distorted due to the phase and magnitude attenuation characteristics of the cable. After the received signal is equalized, or restored, it can then be processed by other functional devices to extract the information that was originally transmitted.

Traditional equalizer circuits can be categorized as two types, namely fixed and adaptive. On the first order, the cable attenuation varies with the length and the temperature of the cable. A fixed equalizer circuit provides a certain amount of signal restoration based on anticipated cable attenuation and is generally optimized for a compromised length and temperature. An adaptive equalizer circuit contains circuitry that can detect the amount of attenuation in the received signal and provide the correct amount of compensation, even as the length and temperature of the cable change over time. Examples of known adaptive equalizer circuits include the continuous time linear equalizer and the transversal filter equalizer. The fixed equalizer can be considered as a subset of an adaptive equalizer circuit.

Equalizer circuits can be designed as analog or digital signal processing circuits, known analog equalizer circuits that are adaptive are generally implemented as a continuous feedback controlled function. All of the known analog equalizer circuits use continuous feedback control for the adaptive behavior. Equalizer circuits of this type must be customized to a specific set of parameters and there is no scaleability in general. Moreover, such equalizer circuits typically exhibit long adaptation time for changes in the input signal caused by changes in cable environment.

SUMMARY OF THE INVENTION

The present invention provides an equalizer circuit for equalizing waveform distortion of a transmitted signal that has been transmitted through a lossy transmission medium from a signal source to a signal receiver. The equalizer circuit comprises equalizing circuit means which includes a plurality of equalizer units. The equalizing circuit means has an input for receiving an information bearing signal transmitted through the transmission medium, and a plurality of outputs for providing a plurality of equalized signals which represent a version of the received information bearing signal with incremental degrees of processing by the equalizer units. A control means processes the equalized signals provided at all of the outputs to determine the one of the plurality of equalized signals that exhibits minimum error relative to the information bearing signal at the signal source. A select means is responsive to the control means for extending the one equalized signal to a signal output of the equalizer circuit.

The invention consists of certain novel features and details hereinafter fully described, illustrated in the accompanying drawings, and particularly pointed out in the appended claims, it being understood that various changes in details can be made without departing from the spirit and scope of the invention.

DESCRIPTION OF THE DRAWINGS

FIG. 7 is a block diagram of a further embodiment of an equalizer circuit provided by the invention; and FIG. 8 is a simplified representation of one of the loss equalizer units of the equalizer circuit of FIG. 7.

DESCRIPTION OF THE PREFERRED EMBODIMENTS

Figures 1, 2, 3:
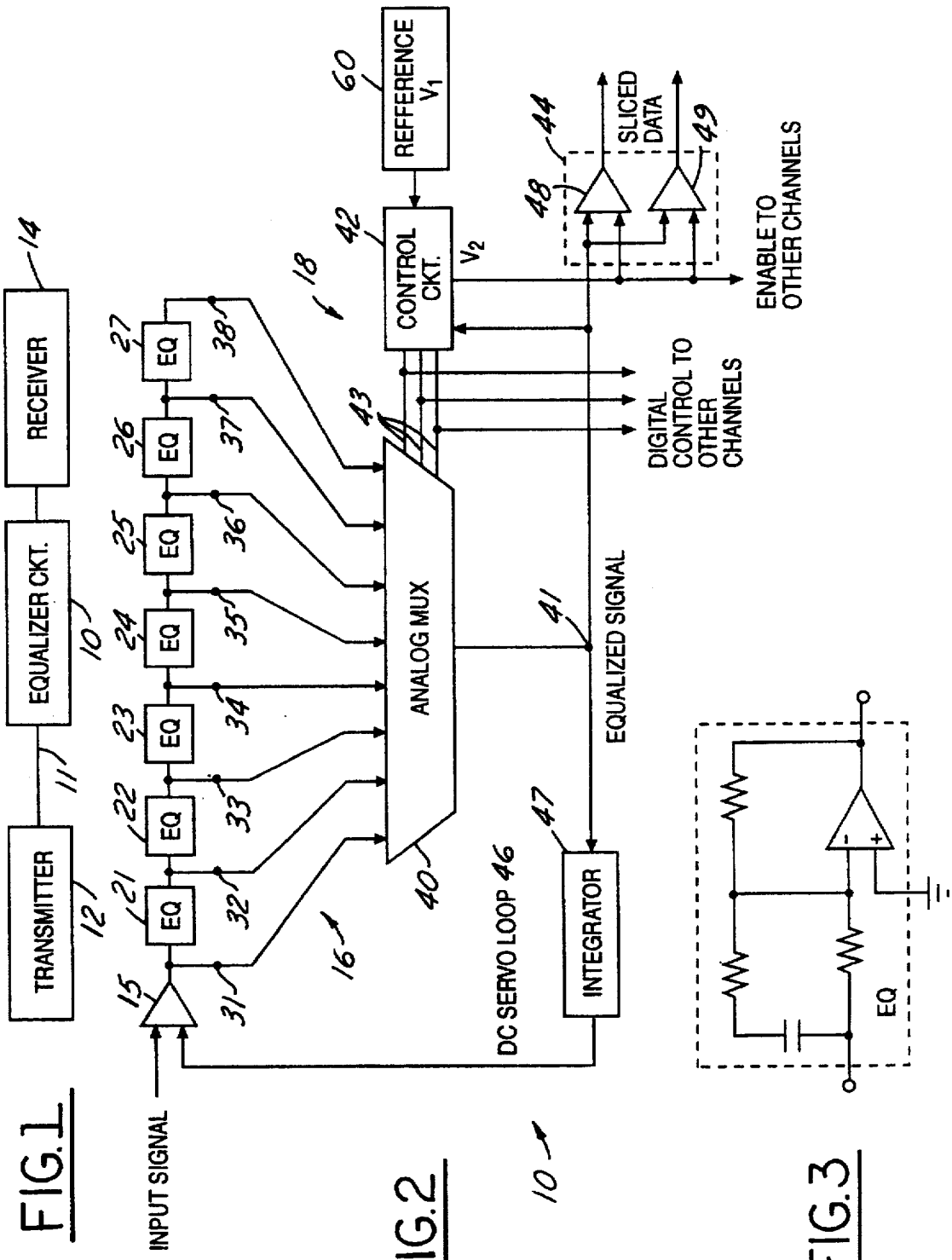
FIG. 1 is a block diagram of a signal transmission system incorporating the equalizer circuit provided by the invention.
FIG. 2 is a block diagram of an equalizer circuit provided by the invention.
FIG. 3 is a simplified representation of an equalizer unit of the equalizer circuit of FIG. 2.

Referring to FIG. 1 of the drawings, the equalizer circuit 10 provided by the invention provides equalization for an information bearing signal that propagates through a lossy transmission medium 11 from a transmitter 12 to a receiver 14, resulting in amplitude attenuation and/or phase distortion due to characteristics of the transmission medium. For the purpose of illustrating the invention, the equalizer circuit 10 is described with reference to an application in a twisted pair cable transmission medium for providing equalization for an information bearing signal that is being transmitted from the transmitter 12 to the receiver 14 through one twisted pair of the cable. The exemplary illustration requires equalizing three pairs out of a four pair bundle which define four separate transmission channels for information bearing signals. However, only one twisted pair of the multi-pair cable 11 is shown in the drawings.

Referring to FIG. 2, which is a block diagram of the equalizer circuit 10 provided by the invention, the equalizer circuit 10 includes an input amplifier 15, a compensating section 16 and a control section 18. The compensating section 16 includes a plurality of equalizer units EQ which are connected in cascade or series with one another. Each of the equalizer units EQ is a fixed compensation circuit. The number of equalizer units and the composition of the equalizer units is selected as a function of application. In the exemplary embodiment, the equalizer circuit 10 is described with reference to an application for providing equalization for 0 to 100 meters of category 3 UTP cable within a temperature variation range of from 0 degrees to 40 degrees Celsius. The tolerable degree of error in equalization is nine meters, up to a maximum of 126 meters, in the exemplary embodiment. Accordingly, the compensating section 16 includes seven equalizer units EQ which have been given the reference numerals 21–27. Each equalizer unit provides compensation for an eighteen meter section of cable.

The compensating section 16 includes eight taps 31–38. A tap 31 is provided at the input of the compensating stage of the equalizer circuit and its signal is the input signal in an unequalized condition. The signals from the equalizer stages appear at the taps 32–37 provided between each equalizer unit stage and at a tap 38 at the output stage of the compensating stage of the equalizer circuit. The signals at the taps 32–38 represent a version of the input signal with incremental degrees of linear processing by the equalizer units 21–27. All of the taps 31–38 are available simultaneously.

Digressing, the optimum number of taps is determined by the allowable error incurred by a one-half segment of misequalization and the maximum cable length for which equalization is required. In the exemplary embodiment, the maximum cable length is 100 meters and the tolerable equalization error is 9 meters. An integer power of two is convenient for the tap selection logic and, for the seven equalizer units of 2*9 meters=18 meters, provides the required 126 meters. The first tap is at 0 meters, corresponding to no equalization, yielding eight taps 31–38 total. Although the equalizer circuit 10 is described with reference to an application for providing equalization for 0 to 100 meters of category 3 UTP between 0 degree to 40 degree Celsius, it is apparent that the equalizer circuit can be used to provide equalization for other lengths of cable and other types of cable and/or transmission media.

The input stage equalizer unit 21 equalizes the received signal by a small amount that is equivalent to a short piece of cable. The partially equalized signal from the input stage equalizer 21 is applied the input of the second stage equalizer unit 22 which provides further equalization of the signal with the resultant signal being applied the third stage equalizer unit 23, etc.

The control section 18 includes a selecting circuit embodied as a multiplexer 40, a control circuit 42, a signal slicer circuit 44 and a DC servo loop 46. The control circuit 42 functions as a decision circuit that examines the output signals provided at all of the taps 31–38 and determines which signal output exhibits minimum error relative to the transmitted signal, and thus is closest to an ideally equalized signal. The control circuit 42 controls the multiplexer 40 to select this tap and the equalized output signal appearing at the selected tap is the output of the entire equalizer circuit 10.

The DC servo loop 46 includes an integrating circuit 47 the input of which is connected to the output 41 of the multiplexer to receive the selected equalized signal. The output of the integrating circuit is connected to one input of the input amplifier 15 of the equalizer circuit for providing a DC offset signal for the input signal being received. In the case where the equalizer units EQ are DC coupled, a significant amount of DC offset can accumulate after a number of equalizer units. The DC servo loop 46 drives the equalized signal average to zero.

The selected equalized signal is applied to the signal slicer circuit 44 which includes a pair of comparator circuits 48 and 49 for processing the signal to extract the information that was originally transmitted. A second input to each of the comparator circuits is a DC signal of a value that is derived from the reference signal. Because the average amplitude of the equalized signal is driven to match a DC reference value, the signal which establishes the slicing threshold is scaled from the same reference. Two comparator circuits 48 and 49 are used because a three level code is employed to encode the transmitted signal with information. If a binary signal scheme is used, the signal slicer circuit would include only one comparator circuit.

Considering the equalizer circuit 10 in more detail, with reference to FIG. 3, each equalizer unit EQ includes an operational amplifier connected for operation as a high pass filter circuit. In the exemplary embodiment, all of the equalizer units EQ have identical transfer functions.

It is not necessary for all of the equalizer units to be identical, as long as they are similar in nature. However, the use of identical equalizer units greatly simplifies the control section of the equalizer circuit.

Figure 4:
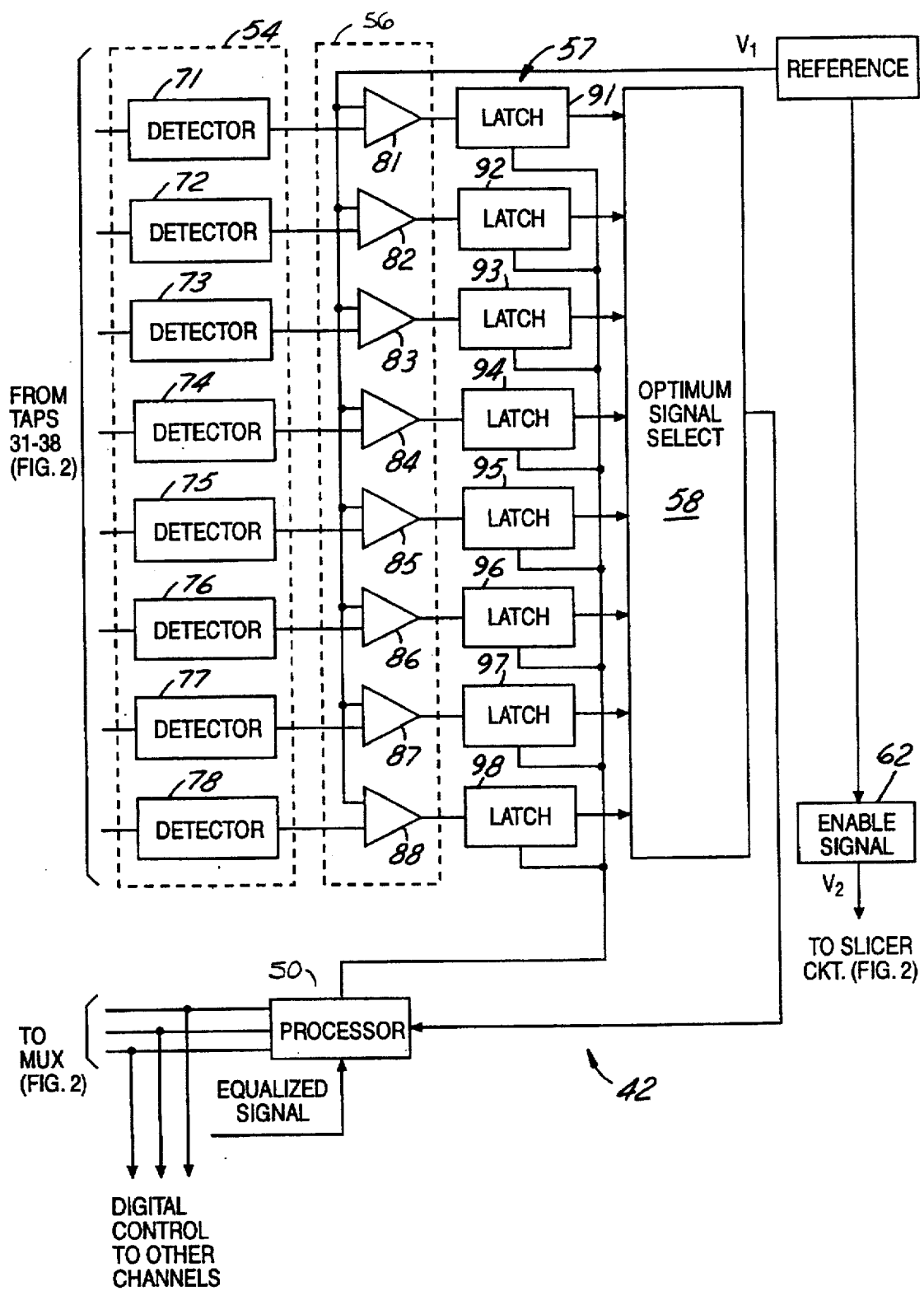
FIG. 4 is a simplified representation of the control circuit of the equalizer circuit of FIG. 2.

Referring to FIG. 4, the control circuit 42 includes a processor 50, a detecting circuit 54, a comparing circuit 56, a signal storage circuit 57, an optimum signal select circuit 58, a reference signal source 60 and an output enabling signal generating circuit 62. The reference signal source 60 provides a DC reference signal $V_1$ that is related to the ideal transmitted signal amplitude. The output enabling signal generating circuit 62 derives from this reference signal $V_1$ a DC signal $V_2$ that is a scaled value of the reference signal.

For equalizing only the loss effects of metallic cables, the relationship between envelope or group delay and amplitude attenuation is used to determine the amount of equalization required. The detecting circuit 54 includes a plurality of envelope detectors 71–78. The processor 50 connects an envelope detector to each tap and compares the low frequency envelope signal produced by the envelope detectors 71–78 to the DC reference signal $V_1$ provided by the reference source 60. The comparison of each tap envelope signal and the common reference signal $V_1$ is made in parallel. It is important to control the transmitted signal amplitude at the transmitter because amplitude attenuation is used in determining the amount of equalization that is required.

The inputs of the envelope detectors 71–78 are connected to respective taps 31–38 of the compensating section 16 (FIG. 2). The outputs of the envelope detectors 71–78 are connected to first inputs of respective comparators 81–88 of the comparing circuit 56. The comparators 81–88 have second inputs connected to the output of the reference source 60 for receiving the reference signal $V_1$. The outputs of the comparator circuits 81–88 are connected to the inputs of latch circuits 91–98 of signal storage circuit 57. The outputs of the latch circuits 91–98 are connected to inputs of the optimum signal select circuit 58 which provides an output signal to the processor 50 for identifying the tap at which appears an equalized signal that is closest to an ideally equalized signal. The optimum signal select circuit may be software implemented.

The processor 50 responds to the signal provided by the optimum signal select circuit 58 to provide a binary coded select signal on the set of output conductors 43 for enabling the multiplexer 40 to pass the signal appearing at the selected tap to its output 41. The output 41 of the multiplexer 40 is connected to the input of the slicer circuit 44 which forms the output stage of the equalizer circuit 10. The output conductors 43 are multipled for controlling tap selection in other channels for selecting an equalized output signal in those channels. Although the exemplary illustration requires equalizing three pairs out of a four pair bundle, the mismatch between loss characteristics between pairs in the same bundle is insignificant and so a common control circuit used for all three pairs.

Referring to FIGS. 1, 2 and 4, the operation of the equalizer circuit 10 will be described. When a signal is received, it is propagated through the compensating section 16 of the equalizer circuit 10. When a signal is first applied to the equalizer circuit 10, the control section 18 effectively measures the length of cable 11 that is connected between the receiver 14 and the transmitter 12. The envelope detectors 71–78 detect the envelopes of the signals appearing at the taps 31–38. The low frequency envelope signals are compared by respective comparators 81–88 with the reference signal $V_1$ provided by reference signal source 60. The outputs of the comparators are clocked into respective latch circuits 91–98 in response to a clock signal provided by the processor 50. The clock signal is provided at a rate greater than about 250 nanoseconds to enable processing of the signal outputs of the comparators 81–88 by the optimum signal select circuit 58. The optimum signal select circuit 58 determines the signal having the smallest error, i.e., the signal that is closest in amplitude to the reference value $V_1$. The processor 50 responds to an output signal provided by the optimum signal select circuit 58 to generate the appropriate binary signal on conductors 43 for enabling the multiplexer 40 to extend the selected signal to the output 41 of the multiplexer for application to the signal slicer circuit 44. The equalized signal provided at the selected tap is applied to the inputs of the comparators of the signal slicer circuit for recovering the information originally transmitted. As has been indicated, the slicing threshold of the signal slicer circuit is established by the output enabling signal $V_2$ which, in turn, is derived from the reference signal $V_1$. In addition, the equalized signal is applied to the integrating circuit 47 of the DC servo feedback loop which responsively provides an offset signal for the input amplifier 15 of the equalizer circuit 10 for compensating for any DC offset occurring in the DC coupled stages 21–27 of the compensating section of the equalizer circuit 10.

Once the best signal is selected, this output is maintained by the processor 50. However, the processor 50 periodically checks for any change in the signal being received. If for any reason, such as a change in temperature, there is a significant change in the received signal, the control section 18 determines the tap at which appears the signal with the least error and such tap is selected as the output of the equalizer circuit 10. Also, if the signal that is being received by the equalizer circuit is terminated and subsequently restored, with reassertion of the signal, the previous setting, i.e. tap, is used. In most cases, this is the tap at which appears the signal with least error. Upon reassertion of the signal, the equalization should be correct without an adaptation cycle as long as the media remains unchanged. However, all taps are tested in parallel, so that the equalized signal that has the smallest error relative to the transmitted signal is quickly selected.

Figure 5:
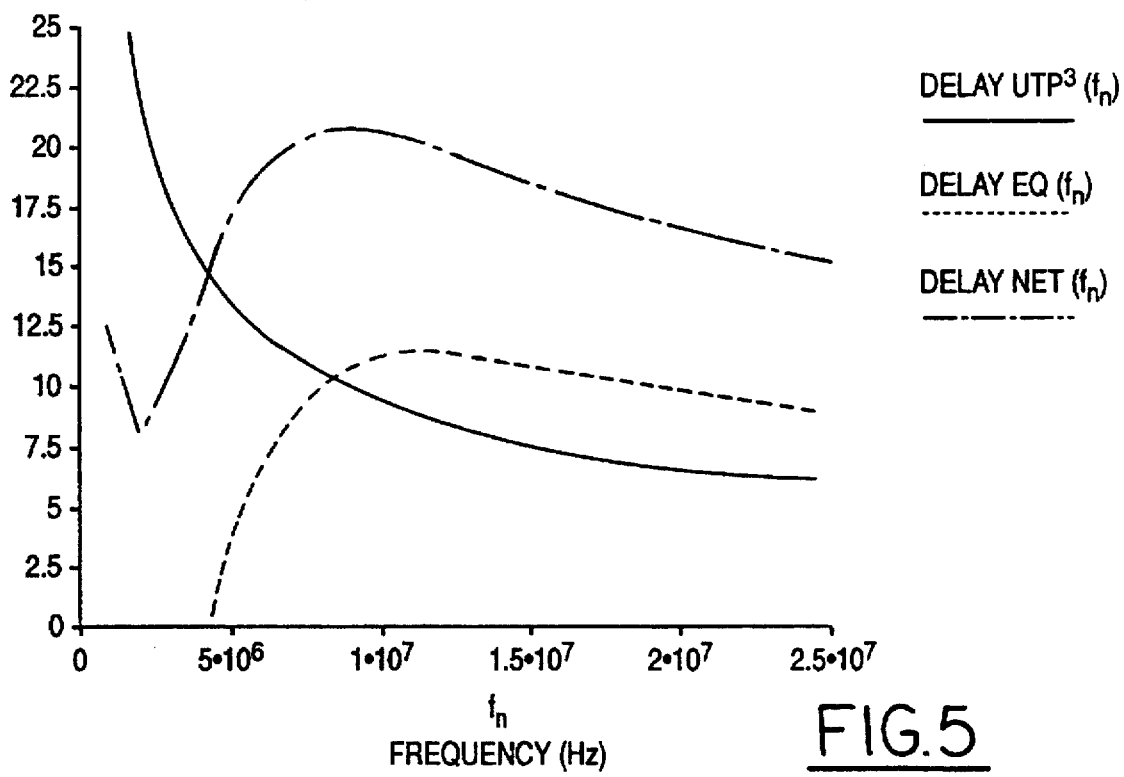
FIG. 5 is a graphical representation of delay variation versus frequency for a 100 meter transmission cable and for the equalizer circuit, and illustrating the net 100 meter delay variation.

The magnitude and envelope delay frequency response of the equalizer units EQ are optimized for a particular set of media and signal power spectral density characteristics. FIG. 5 is a graphical representation of delay variation versus frequency for a 100 meter transmission line, represented by the solid line, and of delay variation versus frequency, represented by the dotted line, for an equalizer circuit that was constructed in accordance with the invention and tested. In addition, FIG. 5 illustrates the net 100 meter delay variation which is represented by the dot-dashed line. As can be seen, the net delay variation is substantially constant over the frequency range from about 5 MHz to about 25 MHz.

Figure 6:
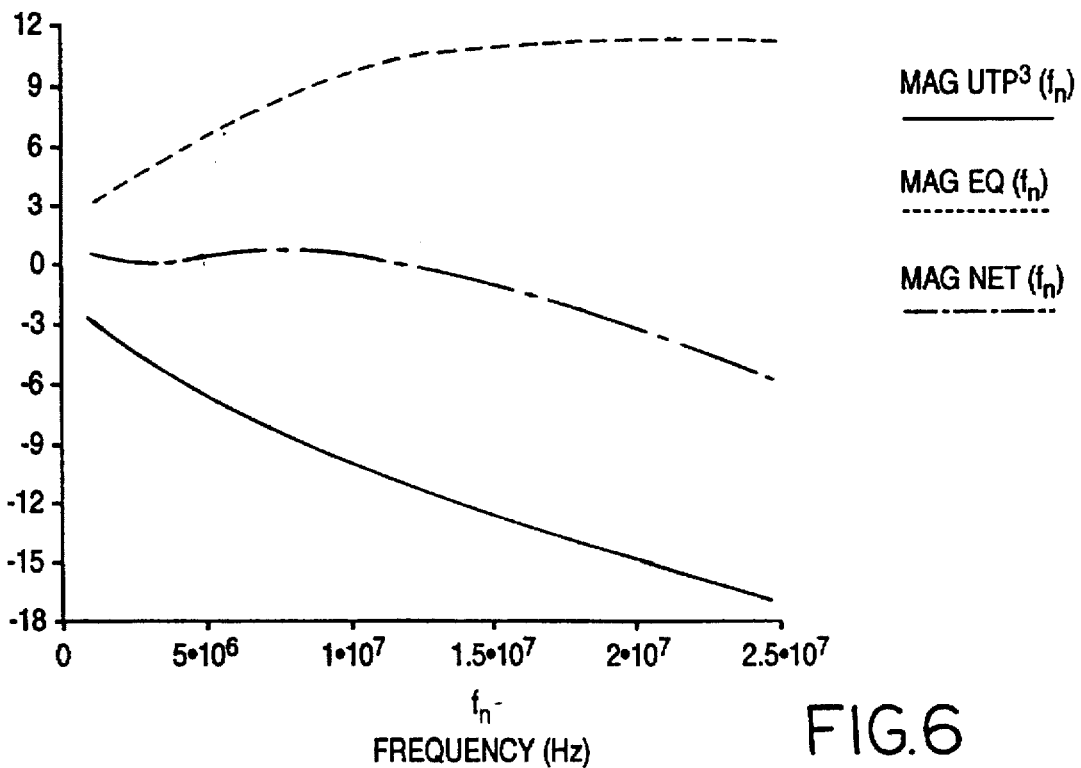
FIG. 6 is a graphical representation of magnitude variation versus frequency for a 100 meter transmission cable and for the equalizer circuit, and illustrating the net equalized magnitude response.

FIG. 6 is a graphical representation of magnitude variation versus frequency for a 100 meter transmission line, represented by the solid line, and of magnitude variation versus frequency, represented by the dotted line, for an equalizer circuit that was constructed in accordance with the invention and tested. In addition, FIG. 6 illustrates the net equalized magnitude response, represented by the dot-dashed line. As can be seen, the net attenuation is approximately 0 db up to about 15 MHz.

Referring to FIG. 7, in accordance with a further embodiment of the equalizer circuit 100, the input stage of the compensation circuit includes a fixed equalizer unit EQa, three gain equalizer units EQ and three loss equalizer units—EQb. The equalizer circuit 100 is designed to provide equalization for 0 to 100 meters of category 3 UTP over a comparative range of 0 degrees to 40 degrees Celsius. The fixed equalizer unit EQa provides compensation for a major portion of the transmission line, which, in the exemplary embodiment is 54 meters of the cable. The equalizer unit EQa provides an output at tap 31 that represents a version of the input signal with linear equalization for 54 meters of cable. Equalizer circuits, such as equalizer circuit 100 in which one of the equalizer units provides equalization for 50% or more of the transmission line, have a signal-to-noise ratio advantage as compared to equalizer circuits which include equalized circuits that provide equalization for smaller segments of the transmission line.

The gain equalizer units EQ, which have been given reference numerals 101–103, are connected in series with one another and to the output of the fixed equalizer unit EQa and provide the same function as the equalizer units 21–23 of equalizer circuit 10 (FIG. 2). Each of the equalizer units can be the same as the equalizer unit illustrated in FIG. 3. In the exemplary embodiment, each of the equalizer units 101–103 provides compensation for an eighteen meter section of cable, each providing an output at respective taps 32, 33 and 34 which represents a version of the input signal with incremental degrees of linear processing. These equalizer units EQ account for under-compensation by the fixed section EQa.

The loss equalizer units—EQb, which have been given the reference numerals 104–106, are connected in series with one another and to the fixed equalizer unit EQa. Each equalizer unit 104–106 provides compensation for an eighteen meter section of cable. The equalizer units—EQb provide a negative or lossy equalizing function, serving to provide outputs at respective taps 35, 36 and 37 which represent a version of the input signal with incremental degrees of linear processing, but which exhibit a reduction in the amplitude of the signal. These equalizer units—EQb account for over-compensation by the fixed section EQa. By way of example, each equalizer unit—EQb can include an operational amplifier connected for operation as a low pass filter circuit, as shown in FIG. 8.

The control section 18 of the equalizer circuit 100 is the same as that for the equalizer circuit 10 of FIG. 2 and accordingly like elements have the same reference numerals. The manner in which equalizer circuit 100 operates is apparent from the foregoing description of the operation of the equalizer circuit 10 and accordingly, will not be described.

Thus, it has been shown that the present invention provides an equalizer circuit that includes a plurality of equalizer units each of which provide at its output a signal which represents a version of the input signal with incremental degrees of linear processing by the equalizer units. The outputs of the equalizer units are individually selectable to provide as the output of the equalizer circuit, the signal that is closest to an ideally equalized signal. Although the equalizer circuit is described with reference to an application in a system in which the signal is transmitted over a twisted pair cable, the invention is not limited to such application. Moreover, the invention is applicable to all types of equalizer circuits and the principles of the invention are applicable to other circuits, such as automatic gain control circuits and the like. In such applications, the equalizer units used are non-frequency dependent circuits or networks.

While the invention has been described with reference to preferred embodiments, various modifications can be made without departing from the spirit and scope of the invention as defined in the appended claims.

I claim:

1. An equalizer circuit for equalizing waveform distortion of an information bearing signal comprising:

an equalizing circuit including a plurality of equalizer units, said equalizing circuit having an input for receiving an information bearing signal transmitted through a transmission medium from a signal source, and a plurality of outputs for providing a plurality of equalized signals which represent a version of the received information bearing signal with incremental degrees of processing by said equalizer units wherein said equalizer units are DC coupled to one another;

a control circuit for processing said plurality of equalized signals provided at a second plurality of said outputs to select the one of said plurality of equalized signals that exhibits minimum error relative to the transmitted information bearing signal at said signal source, wherein said control circuit includes means for deriving from said selected equalized signal an offset signal for compensating for offset in said one selected equalized signal caused by propagation of said received signal through said plurality of equalizer units; and a select circuit responsive to said control circuit for selecting said one equalized signal to be provided to a signal output of said equalizer circuit.

2. The equalizer circuit according to claim 1, wherein a plurality of said equalizer units are connected in series with one another, and wherein each of said equalizer units provides equalization for a portion of said transmission medium.

3. The equalizer circuit according to claim 2, wherein a first one of said plurality of equalizer units provides compensation for a major segment of said transmission medium, at least a second one of said plurality of equalizer units being connected in series with said first equalizer unit and providing equalization for a smaller segment of said transmission medium, and wherein a third one of said plurality of equalizer units is connected in series with said first equalizer unit.

4. The equalizer circuit according to claim 1, wherein said plurality of equalizer units have identical transfer functions.

5. The equalizer circuit according to claim 1, including output circuit means for processing said one selected equalized signal to recover information from said one selected equalized signal, and output enabling means providing an enabling signal for establishing a reference threshold for said output circuit means, said enabling signal being derived from a reference signal that is related to an ideal signal amplitude for said transmitted information bearing signal.

6. The equalizer circuit according to claim 1, wherein said transmitted information bearing signal experiences amplitude attenuation due to characteristics of said transmission medium resulting in a low frequency envelope signal of said received signal, said control circuit including a detecting circuit for detecting the low frequency envelope signal of each of said plurality of equalized signals and a comparing circuit for comparing said low frequency envelope signals with a common reference signal in determining said one selected equalized signal that exhibits said minimum error.

7. An equalizer circuit for compensating for waveform distortion of an information bearing signal that is transmitted through a lossy transmission cable from a signal transmitter to a signal receiver, said equalizer circuit comprising:

equalizing circuit means including a plurality of equalizer units, said equalizing circuit means having an input for receiving an information bearing signal transmitted through said transmission cable, and a plurality of taps for providing a plurality of partially equalized signals which represent a version of the information bearing signal that is received by said equalizing circuit means;

control means for processing said plurality of partially equalized signals provided at all of said taps to determine the one of said plurality of partially equalized signals that exhibits minimum error relative to the information bearing signal at said signal transmitter, wherein said control means maintains said one partially equalized signal selected upon termination and reassertion of the received signal; and select means responsive to said control means for selecting the tap of said plurality of taps at which said one partially equalized signal, to be provided to an output of said equalizer circuit, appears.

8. The equalizer circuit according to claim 7, wherein said control means includes output circuit means for processing said one partially equalized selected signal to recover information from said one partially equalized selected signal, and output enabling means for establishing a reference threshold for said output circuit means that is derived from a reference signal related to an ideal signal amplitude for said transmitted information bearing signal.

9. The equalizer circuit according to claim 7, wherein a plurality of said equalizer units are connected in series and wherein each of said equalizer units provides equalization for a section of said transmission cable.

10. The equalizer circuit according to claim 9, wherein a first one of said plurality of equalizer units provides compensation for a major segment of said transmission cable, at least a second one of said equalizer units being connected in series with said first equalizer unit and providing equalization for a smaller segment of said transmission cable, and wherein a third one of said equalizer units is connected in series with said first equalizer unit.

11. The equalizer circuit according to claim 7, wherein said select means includes a multiplexing means responsive to control signals provided by said control means for selectively extending the outputs of said equalizer units to said output of said equalizer circuit.

12. The equalizer circuit according to claim 7, wherein said transmitted information bearing signal experiences amplitude attenuation due to characteristics of said transmission cable, whereby each of said plurality of partially equalized signals has a low frequency envelope signal, and wherein said control means includes detecting means for detecting the low frequency envelope signal of each of said plurality of partially equalized signals, comparing means for comparing said low frequency envelope signals with a common reference signal in determining the one of said partially equalized signals that exhibits said minimum error, and processing means for controlling said detecting means.

13. The equalizer circuit according to claim 12, wherein said reference signal is related to an ideal signal amplitude for said transmitted information bearing signal.

14. An equalizer circuit for compensating for waveform distortion of an information bearing signal that is transmitted through a lossy transmission cable from a signal transmitter to a signal receiver, said equalizer circuit comprising:

equalizing circuit means including a plurality of equalizer units, said equalizing circuit means having an input for receiving an information bearing signal transmitted through said transmission cable, and a plurality of taps for providing a plurality of partially equalized signals which represent a version of the information bearing signal that is received by said equalizing circuit means;

control means for processing said plurality of partially equalized signals provided at all of said taps to determine the one of said plurality of partially equalized signals that exhibits minimum error relative to the information bearing signal at said signal transmitter, wherein said control means includes feedback means having integrated circuit means for integrating said selected one partially equalized signal to produce an offset signal for compensating for offset in said one partially equalized signal; and select means responsive to said control means for selecting the tap of said plurality of taps at which said one partially equalized signal, to be provided to a signal output of said equalizer circuit appears.

* * * * *